J. G. GARLAND.
NUT LOCK.
APPLICATION FILED JULY 29, 1914.
1,131,053.
Patented Mar. 9, 1915.
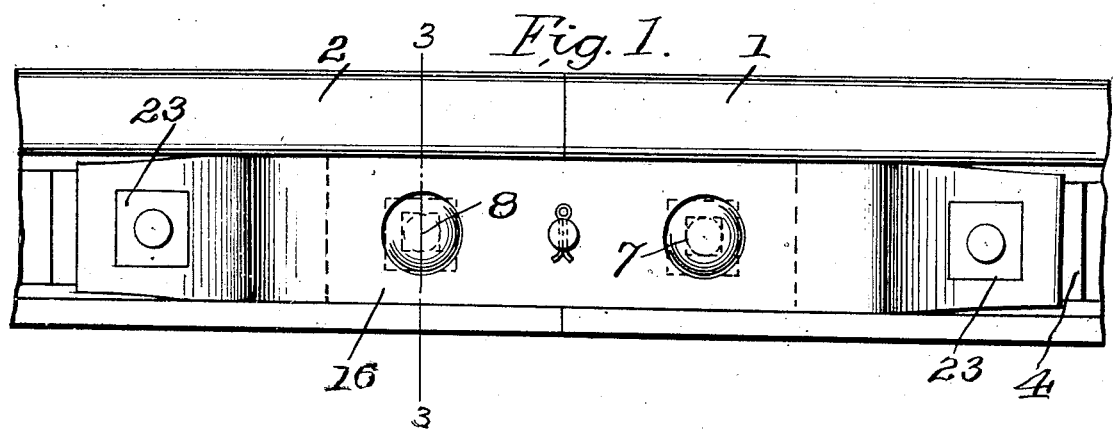
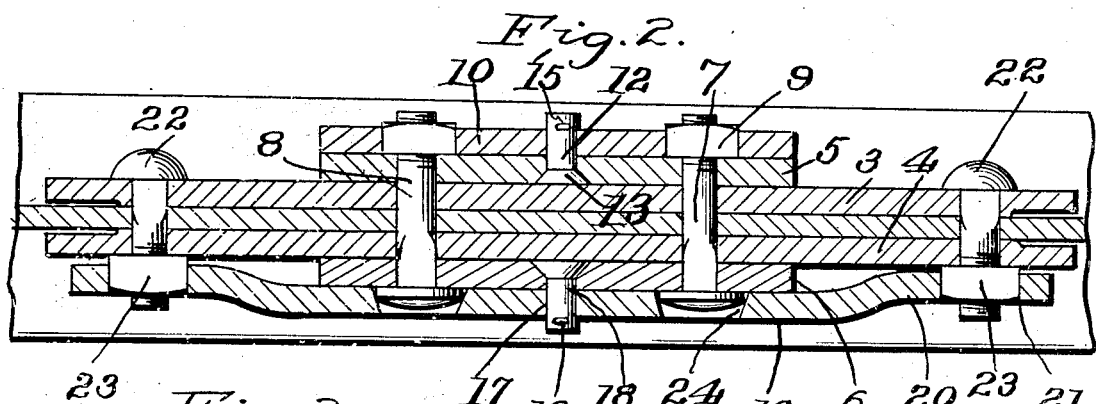
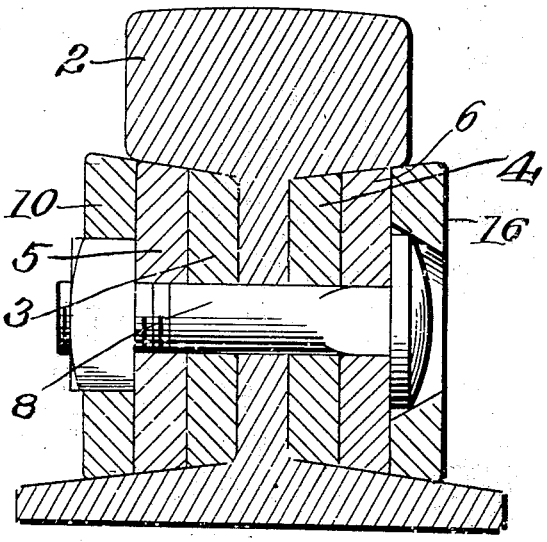
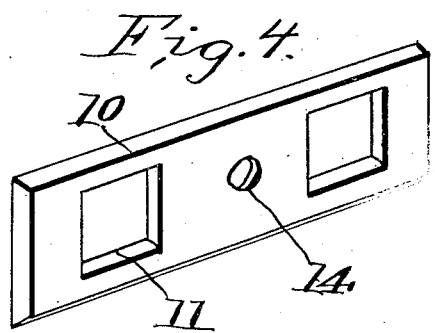
Witnesses
Inventor
J. G. Garland.
By
Attorney

UNITED STATES PATENT OFFICE.

JOHN G. GARLAND, OF HIGH POINT, NORTH CAROLINA.

NUT-LOCK.

1,131,053.  Specification of Letters Patent.  Patented Mar. 9, 1915.

Application filed July 29, 1914. Serial No. 853,848.

*To all whom it may concern:*

Be it known that I, JOHN G. GARLAND, a citizen of the United States, residing at High Point, in the county of Guilford and State of North Carolina, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in devices for locking nuts and is particularly designed for use in connection with rail joints and resides in the provision of simple, effective and inexpensive means that will positively hold a nut against negative rotation.

Another object is to provide a nut lock device that may be easily and quickly applied to a rail joint without necessitating any change in the construction of the rails or fish plates at the joint and which will prove durable and efficient in operation and inexpensive to manufacture.

The above and additional objects are accomplished by such means as are illustrated in the accompanying drawings, described in the following specification and then more particularly pointed out as claimed.

With reference to the drawings wherein I have illustrated the preferred embodiment of my invention as it is reduced to practice and throughout the several views of which similar reference numerals designate corresponding parts, Figure 1 is a side elevation of rails joined with my improved nut locking device, Fig. 2 is a longitudinal sectional view taken through Fig. 1, Fig. 3 is a vertical sectional view taken transversely on line 3—3 of Fig. 1, and Fig. 4 is a detail perspective view of the one of the nut locking plates.

Referring to the drawings by characters of reference, the numerals 1 and 2 designate the rails at a joint and 3 and 4 fish plates of the ordinary construction. Mounted upon opposite sides of the rails 1 and 2 upon the fish plates are rectangular spacing plates 5 and 6 that are of approximately one-third the length of the fish plates and are directly opposed to one another and formed with openings adjacent to the ends thereof to receive bolts 7 and 8. The bolts 7 and 8 are inserted through the rail webs, fish plates and alined openings in the member 5 and 6 with their heads resting upon the outer face of the plate 6 and have nuts 9 turned on their threaded terminals and resting upon the outer face of the plate 5.

Mounted upon the outer face of the spacing plate 5 is a nut locking plate designated 10 generally and which is rectangular and of approximately the same width, thickness and length as the plate 5. This plate 10 is provided at each end with square openings 11 to receive the nuts 9 on the bolts 7 and 8. Countersunk within the inner face of the plate 5 centrally of said plate and extending beyond the outer face of the plate is a pin 12 that is provided with a beveled head 13 which head is countersunk as described. The locking plate 10 is provided with a central opening 14 that is designed to receive the pin 12 and in assembling the device the plate 10 is positioned so that the pin 12 finds the opening 14 and if the nuts are in the proper position the openings 11 in said plate 10 will receive the nuts and the nuts are thus held against rotation.

A cotter pin 15 is inserted transversely through the outer end of the pin 12 and holds the plate 10 securely upon the plate 5. Mounted upon the outer face of the spacing plate 6 is a locking plate 16 which is rectangular and of approximately the same length as the fish plates. This plate 16 is provided with a central opening 17 which is designed to receive a pin 18 that is identical with the pin 12 and secured to the plate 6 in the same manner. A cotter pin 19 is inserted through the pin 18 to hold the plate 16 in position. The plate 16 is offset adjacent to its ends as at 20 and said offset portions extend inwardly and are designed to engage the rails 1 and 2 on the under faces of the balls and upper faces of the bases of the rails. In this connection it will be noted that all of the plates are beveled on their longitudinal edges so as to conform to the shape of the under face of the ball and upper face of the base of each rail. In each of the offset portions is formed a rectangular or square opening 21 that is designed to receive a nut. Inserted through the fish plates 3 and 4 and rails 1 and 2 adjacent to the ends of the fish plates are bolts 22 that have their heads disposed in engagement with the outer face of the fish plate 3 and the nuts 23 thereon disposed in engagement with the outer face of the fish plate 4. These nuts 23 are positioned within the openings 21 in the offset portions 20 of the locking plate 16 and are held securely against rotation.

Adjacent to the central portion of the plate 16 is formed a pair of circular openings 24. Each of the openings 24 is enlarged inwardly toward the inner face of said plate so that when the plate is positioned the heads of the bolts 7 will engage within the openings 24 but will be countersunk as clearly shown in Fig. 3 in the drawings when said plate 16 is secured in locking position. This arrangement insures the locking action since the heads of the bolts are protected as well as the nuts on the opposed ends thereof.

It will be readily seen that rails when joined with nut locking devices of my improved form will be securely locked against derangement and that the nut and bolts will remain in proper position under all conditions. To remove my improved lock it is only necessary to withdraw the cotter pins 19 and 15 so that the plates 10 and 16 may be removed. All of the plates including the fish plates of my improved device engage the under face of the balls and upper faces of the rails thus a rigid joint is provided as well as a locking of the nuts.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to within the scope of the claims when required, without sacrificing any of the advantages of my invention, as set forth.

What is claimed is:—

1. A nut lock in combination with fish plates of a rail joint, spacing plates mounted upon said fish plates and opposed to one another, pins having heads countersunk in the inner faces of said spacing plates and projecting outwardly from said plates, locking plates having central openings therein to receive said pins and provided with openings adjacent to each end of angular formation to receive nuts, one of said locking plates being longer than the other and provided with openings to receive the heads of bolts, bolts inserted through the rails and plates, nuts turned on said bolts, all of said nuts being disposed within the openings to receive the nuts and held against rotation, and certain of the heads of said bolts being disposed within the longer locking plate.

2. The combination with the rails of a rail joint, and fish plates mounted on opposite sides of said rails, of spacing plates of less length than the fish plates mounted upon opposed sides of the rails and on the fish plates, pins removably secured to the spacing plates and extending outwardly therefrom, locking plates having central openings therein to receive said pins, one of said locking plates being approximately the same length as the spacing plates and having squared openings adjacent to its end, the other of said locking plates being approximately the same length as the fish plates and having squared openings formed therein adjacent to its ends, bolts inserted through the rails, fish plates and outer ends of said last named locking plate, nuts turned on said bolts and to be received within the openings in the outer ends of said last named locking plate, said last named locking plate having its ends offset inwardly and provided centrally of its ends with spaced openings that are enlarged inwardly, bolts inserted through the fish plates, locking plates and spacing plates and having their heads disposed within the last named openings in said last named locking plate, nuts turned on said last named bolts and disposed within the squared openings in said first named locking plate and cotter pins inserted transversely through the outer ends of the pins carried on said spacing plates.

3. In a nut lock the combination with the fish plates of a rail joint, spacing plates mounted upon said fish plates, pins carried by said spacing plates, locking plates having central openings therein and polygonal openings in the ends thereof mounted upon the spacing plates and having the pins received in the central openings therein, one of said locking plates being longer than the other and having its ends offset inwardly, bolts inserted through the several plates and the rails, nuts turned on said bolts and disposed within said polygonal openings in the locking plates, and means to hold said locking plates upon the spacing plates.

In testimony whereof I affix my signature in presence of two witnesses.

JOHN G. GARLAND.

Witnesses:
J. W. SECHREST,
R. H. SECHREST.